Dec. 6, 1927.
F. P. LEWIS ET AL
1,652,023
LEVEL INDICATOR
Filed Sept. 29, 1926
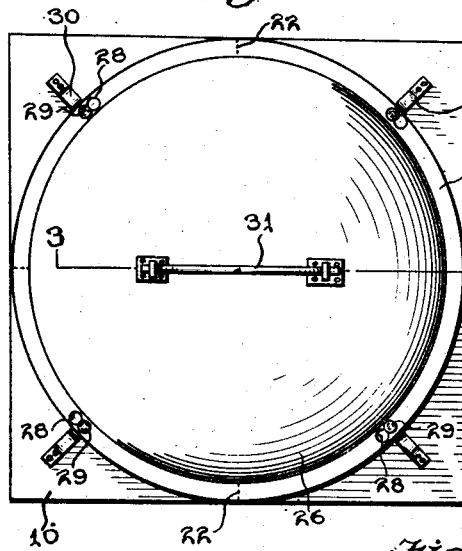
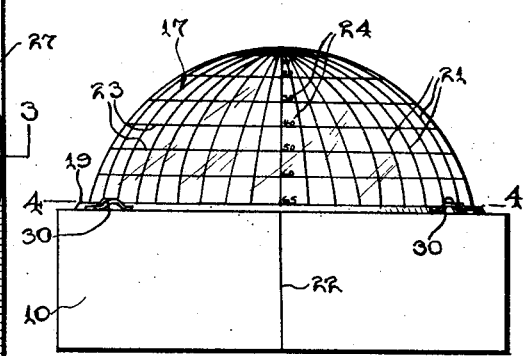
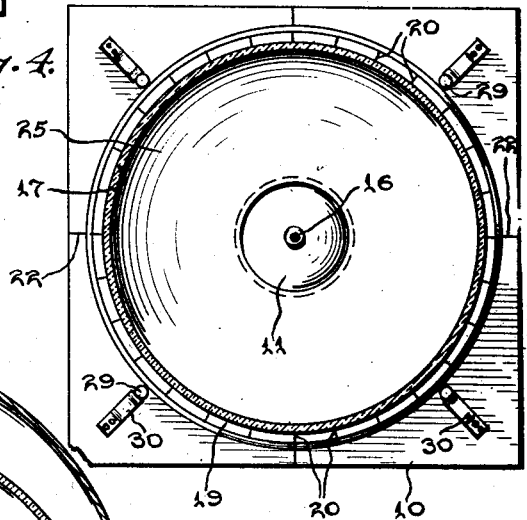
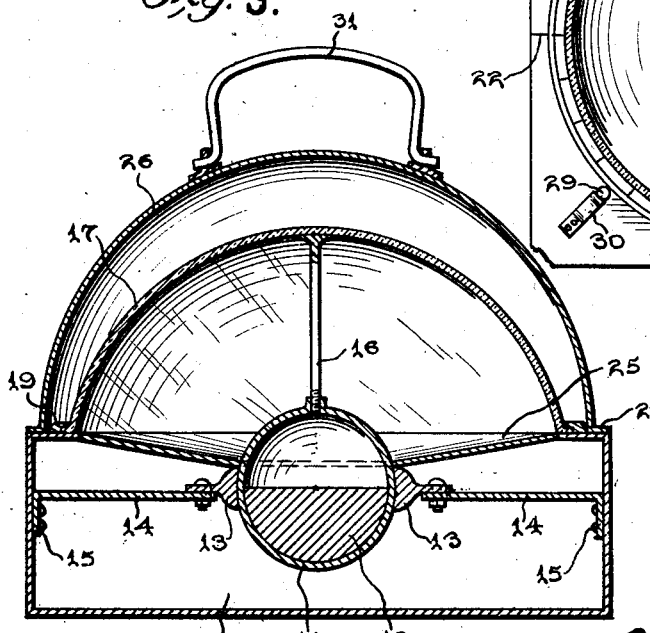
Inventors
Fred P. Lewis
W. V. Thompson
By
Attorney

Patented Dec. 6, 1927.

1,652,023

UNITED STATES PATENT OFFICE.

FRED P. LEWIS AND WALTER V. THOMPSON, OF HAMILTON, OHIO.

LEVEL INDICATOR.

Application filed September 29, 1926. Serial No. 138,429.

The object of the invention is to provide a device having a universally movable indicator operatively mounted with respect to a spherically formed dial, so that deviations from the perpendicular may be readily measured in any direction; to provide a construction in which the dial and indicator may be completely enclosed when the device is not in use and to make the closure in the form of a removable cover having a carrying handle; and to provide a construction of simple form which is therefore susceptible of cheap production and low marketing cost.

With this object in view, the invention consists in a construction and combination of parts of which a preferred embodiment is illustrated in the accompanying drawings, wherein:

Figure 1 is a top plan view of the invention with the cover attached.

Figure 2 is a side elevational view with the cover removed.

Figure 3 is a central vertical sectional view on the plane indicated by the line 3—3 of Figure 1.

Figure 4 is a horizontal sectional view on the plane indicated by the line 4—4 of Figure 2.

The base member 10 is of hollow form to serve as a housing for the indicator actuating member 11, the latter being of spherical form with the lower half weighted, as at 12, and mounted in universal bearings 13 supported by bearing brackets 14, the latter being secured on the remote end walls of the base member, as indicated at 15. The indicator 16 is secured to the actuating member 11 at the diametrically opposite point from the center of gravity of the weighted portion 12 of the actuating member and its extremity traverses the inner spherical surface of the dial 17 which is of hemispherical form and transparent material. The universal bearing 13 consists of a ring secured to the brackets 14 and having its inner periphery formed with a cross-sectionally arcuate groove of which the radius is substantially the radius of the spherical actuating member. Thus the latter is supported in the bearing ring and by reason of the spherical bearing surface in the latter is capable of universal movement.

The dial 17 is secured to the base member by a clamping ring 19, this ring being uniformly divided on its upper face and inscribed with units of angular measurement, as indicated at 20. The dial 17 is provided with a plurality of arcs 21 of great circles crossing at the apex of the dial, the extremities of these arcs coinciding with the markings 20 on the ring 19, the base member at center points on its four sides being provided with the marking lines 22 arranged at the 0—360°, 90°, 180° and 270° points on the ring 19.

In addition to the arcs 21, the dial 17 is provided with the horizontally arranged parallel circles 23 uniformly spaced angularly with respect to the center of the sphere on which the dial 17 is formed, and the arcs 21 corresponding with the lines 22 are inscribed at the points where they cross the parallel circles 23 with indicia 24 indicative of angular units.

Within the base and below the plane of the dial 17 there is provided a reflector plate 25.

With the base 10 level, the indicator 16 stands vertically with its extremity directly below the point where the arcs 21 cross and any deviation of the base from a horizontal position will be immediately indicated by the movement of the indicator 16, the position of the latter indicating whether the lack of horizontality is in a direction longitudinally of the base, transversely of the base or diagonally of the base, the indicator in the one instance following the arc 21 arranged longitudinally of the base, in the other instance following the arc 21 arranged transversely of the base and in the last instance following one of the intermediate arcs or a line between the two. It is thus easy to determine at what point or in what direction the piece or apparatus being tested is low or high.

A cover 26 is provided for enclosing the dial when the device is not in use. This cover is preferably of hemispherical form, being provided with an out-turned flange 27 at its lower edge in which are formed key slots 28, the latter being engageable with headed studs 29 secured to the base, and the cover, when attached, being retained in engagement with the studs by means of friction springs 30.

A handle 31 is provided at the top of the cover in the center to serve as a means for transporting the device.

The invention having been described, what is claimed as new and useful is:

An inclinometer having a hollow base, a hemispherical dial surmounting the base, a bearing ring supported within the base and above the bottom of the latter, and a spherical actuating member carried by the bearing ring and having an indicator traversing the dial on the inner spherical surface thereof, the actuating member being weighted directly opposite the indicator, and the bearing ring being formed with a circumferential groove on its inner periphery, said groove being cross-sectionally arcuate and formed to a radius substantially that of the actuating member.

In testimony whereof they affix their signatures.

FRED P. LEWIS.
WALTER V. THOMPSON.